United States Patent [19]

Sproston et al.

[11] Patent Number: 4,782,927

[45] Date of Patent: Nov. 8, 1988

[54] ELECTROVISCOUS FLUID-ACTUATED DEVICES

[75] Inventors: John L. Sproston, Heswall; Nigel G. Stevens, Coventry, both of England; Ian M. Page, Rustenburg, South Africa

[73] Assignee: National Research Development Corporation, London, England

[21] Appl. No.: 45,451

[22] Filed: May 4, 1987

Related U.S. Application Data

[63] Continuation of Ser. No. 516,600, Jul. 22, 1983, abandoned.

[30] Foreign Application Priority Data

Jul. 22, 1982 [GB] United Kingdom ................ 8221191

[51] Int. Cl.⁴ ............................................. F16D 37/02
[52] U.S. Cl. ................... 192/21.5; 192/58 B; 192/84 E
[58] Field of Search ................ 192/21.5, 30 R, 58 R, 192/84 R, 84 E, 58 B; 188/267, 290; 303/91

[56] References Cited

U.S. PATENT DOCUMENTS

| | | | |
|---|---|---|---|
| 2,417,850 | 3/1947 | Winslow | 192/84 E |
| 2,886,151 | 5/1959 | Winslow | 192/21.5 |
| 3,047,507 | 7/1962 | Winslow | 192/21.5 X |
| 3,144,921 | 8/1964 | Martinek | 192/21.5 |
| 3,150,678 | 9/1964 | Nuber | 192/21.5 X |
| 3,239,041 | 3/1966 | Klass | 192/21.5 |
| 3,385,793 | 5/1968 | Klass et al. | 192/21.5 X |
| 3,711,162 | 1/1973 | Steinbrenner et al. | 303/91 |
| 4,005,909 | 2/1977 | Jones | 303/91 |
| 4,444,298 | 4/1984 | Stangroom | 192/21.5 |

OTHER PUBLICATIONS

*Journal of Applied Physics*, "Induced Fibration of Suspensions", W. M. Winslow, vol. 20, 12/49, pp. 1137-1140.

Dow Corning Silicone Notebook, Ref. No. 2003, Issued 6/52, "Dow Corning 200 Fluids", pp. 1-32.

*Primary Examiner*—Rodney H. Bonck
*Attorney, Agent, or Firm*—Raymond N. Baker

[57] ABSTRACT

An electroviscous fluid actuated device, such as a clutch, comprises relatively rotatable electrode plates (10,11) defining a gap (12) therebetween of 2 mm to 5 mm width. An electroviscous fluid in the gap (12) becomes "solid" when a pulsating d.c. is applied to the plates. Slippage can be controlled by controlling the peak value of the pulsating d.c.

The electroviscous fluid comprises a suspension of starch in silicone oil, having a ratio by weight of at least 1:1.

11 Claims, 1 Drawing Sheet

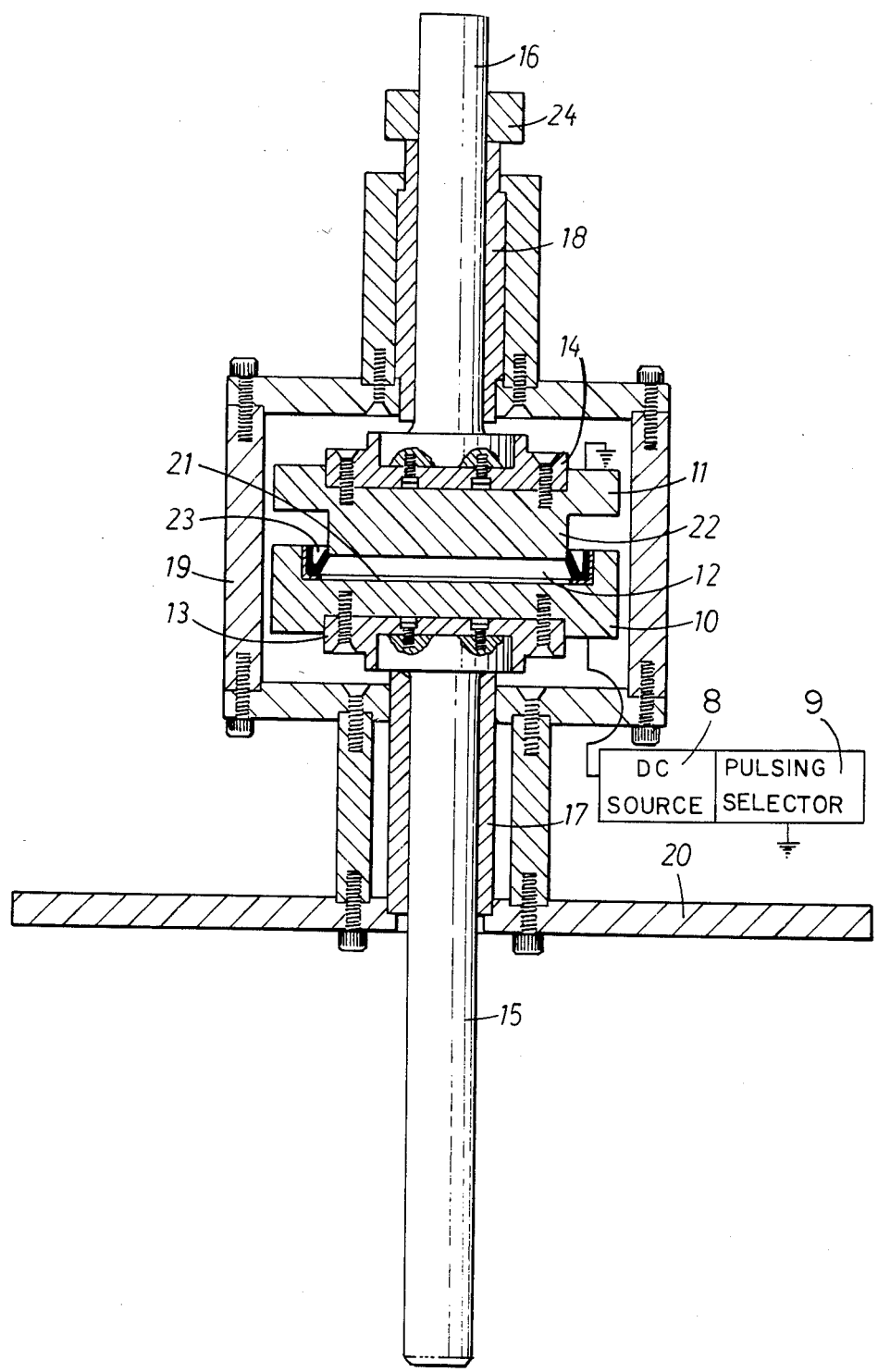

ELECTROVISCOUS FLUID-ACTUATED DEVICES

This is a continuation of application Ser. No. 516,600, filed July 22, 1983, and now abandoned, the entire disclosure of which is incorporated herein by reference.

The present invention relates to devices designed to be actuated by means of an electroviscous fluid and to electroviscous fluid compositions.

When certain fluids are subjected to an electrostatic potential they become increasingly viscous or even solid. This effect, sometimes called the Winslow effect, is broadly described in Winslow's U.S. Pat. No. 2,417,850. Electroviscous fluids exhibiting this property are fluids which comprise a suspension of particles generally having a high dielectric constant in a fluid generally having a low dielectric constant. The particles are generally hydrophilic particles to which water is absorbed to impart the high dielectric property. In devices actuated with the use of an electroviscous fluid, the fluid is contained in a small gap between two electrically conductive members which serve as electrodes. When the device is a valve, the fluid can flow freely through this gap. When the device is a mechanical device, such as a clutch or brake, the two members can be moved freely relative to one another whilst maintaining the gap. When an electric potential is applied to the electrodes, the fluid, in effect, solidifies thereby stopping fluid flow through the gap in the case of a valve or preventing relative movement between the electrodes, in the case of a brake or clutch.

The pressure which the device is capable of withstanding in the case of a valve or the force or torque which the device is capable of withstanding in the case of a clutch or brake is dependent amongst other things on the electrostatic potential applied between the electrodes. With an increasing electrostatic field, the shear force which the fluid is capable of withstanding is progressively increased until the point is reached when the fluid will no longer flow and effectively becomes solid. In the case of a valve, the reaching of this point means that the valve is fully closed and, in the case of a clutch or brake, the reaching of a solid state results in there being no slipping.

It has now been found that a pulsating electrostatic field has a number of surprising advantages when used to influence an electroviscous fluid.

Thus, according to one aspect of the present invention, an electroviscous fluid-actuated device having electrodes defining a gap therebetween, such gap containing an electroviscous fluid, is provided with means for applying a pulsating direct voltage to the electrodes.

Advantages of the use of a pulsating direct voltage are that a better control of slippage, in the case of a clutch or brake, a smaller power consumption and a reduced liability to electrostatic discharge.

Various fluids have been tried as electroviscous fluids. Hitherto the phenomenon by which electroviscous fluids exhibit their electroviscous properties has not been clearly understood and electroviscous fluid-actuated devices have up to now found little commercial application, no doubt at least in part due to the weakness of the electroviscous fluid solidified under the influence of the electrostatic field.

According to another aspect of the present invention, an electroviscous fluid comprises a suspension of particles in a liquid, the ratio by weight of particles to liquid being 1:1 at least and preferably not more than 1.8:1.

The electroviscous fluid according to the invention may thereby be of pasty consistency.

According to a further aspect of the present invention, the liquid component of an electroviscous fluid is a silicone fluid. The viscosity of the silicone fluid is advantageously between 1 centistoke and 500 centistokes and is preferably about 350 centistokes. The particulate material of an electroviscous fluid according to the invention is preferably starch but may be silica gel or a mixture of silica gel and starch.

The present invention will be further described, by way of example, with reference to the accompanying drawing which is a sectional elevation of a clutch constructed in accordance with the invention to be actuated with the use of an electroviscous fluid.

Referring to the drawing, a clutch comprises a lower clutch plate 10 and an upper clutch plate 11 spaced apart to define a gap 12 therebetween. The clutch plates 10 and 11 are of electrically-conductive material or at least their respective surfaces defining the gap 12 are made of electrically conductive material. The plates 10 and 11 are secured by means of insulators 13 and 14 to vertically aligned shafts 15 and 16 respectively. The shafts 15 and 16 are journalled by means of bearings 17 and 18 in a housing 19 mounted to a support 20. By way of example, the shaft 15 may be the input shaft driven by a suitable motor and the shaft 16 may be the output shaft which operates a mechanism to be driven.

Electrical connections to ground and to a d.c. source 8 and pulsating selector 9 are made to the clutch plates 10 as shown schematically in the drawing. These may be effected by means of carbon brushes but are preferably made by means of leaf springs (not shown) which bear respectively against the lower and upper faces of the plates 10 and 11. By way of example, the leaf spring contacting the upper plate 11 may be connected to earth and the leaf spring contacting the plate 10 will then be connected to a suitable source of high voltage, preferably a variable high voltage and, in the preferred embodiment of the present invention, a pulsating d.c. voltage. In the case wherein the upper plate 11 is earthed as suggested, the insulator 14 acts as a safety means to avoid the risk of a high potential being applied to the shaft 16 in the event that the earthing through the leaf spring fails and the plates 10 and 11 at the same time come into physical engagement with one another or an electrical breakdown between the plates 10 and 11 takes place.

In order to retain an electroviscous fluid in the gap 12, the lower plate 10 is formed with a circular recess 21 and the upper plate 11 is formed with a circular spigot 22 which extends into the recess 21 with axial and radial clearance. To avoid the risk of the electroviscous fluid being flung out of the recess 12 under the influence of centrifugal force, a seal 23 of resilient electrically insulating material can be disposed around the periphery of the recess 21 so that a sealing lip on the seal 23 lightly engages the lower end of the cylindrical periphery of the spigot 22.

The confronting faces of the clutch plates 10 and 11 defining the gap 12 must be accurately machined so as to be perpendicular to the vertical axis defined by the shafts 15 and 16. In the simple illustrated embodiment of the invention, a flange at the upper end of the shaft 15 rests on the bearing 17 under gravity to accurately and positively define the axial position of the clutch plate 10. A collar 24 is secured to the upper shaft 16 by means of a suitable grub screw (not shown) or other device and rests under gravity against the upper end of the bearings 18 in order to accurately and positively define the axial position of the upper clutch plate 22. The dimension of the gap 12 is thereby accurately defined.

A typical dimension for the gap 12 is 2 to 3 mm. If the gap is substantially larger than this, e.g. up to 5 mm, more power must be applied between the electrodes in order to obtain a given electrostatic field between the electrodes.

A preferred electroviscous fluid is a fluid comprising a suspension of starch in silicone oil having a viscosity of about 350 centistokes, the ratio of starch to oil by weight being at least 1:1 and preferably 1.5:1. A substantial further increase in the ratio above 1.8:1 is undesirable as it has been found to render the fluid susceptible to electrical breakdown.

The paste-like electroviscous fluids according to the invention have been found to have the further advantage that they are not so prone to settling out and retain their properties even after the device has remained unused for extended periods of several days or more.

In one particular clutch according to the invention the spigot 22 had a nominal diameter of 70 mm, thereby defining the areas of the confronting electrode surfaces between which the electroviscous fluid is contained.

In experiments using clutch plates of these dimensions and an electroviscous fluid consisting of a suspension of finely divided starch in silicone oil having a viscosity of 100 centistokes, the clutch was found to be capable of transmitting torques, when the clutch effectively became fully engaged, given by the following table:

| Ratio of starch to silicone oil (by weight) | Gap (mm) | Potential (KV) | Torque (Nm) |
| --- | --- | --- | --- |
| 1:1 | 2 | 2.5 | 0.15 |
| 1:1 | 3 | 5.0 | 0.15 |
| 1.5:1 | 3 | 5.0 | 0.25 |

The torque which the clutch could transmit can be further increased by increasing the potential between the clutch plates until a point is reached at which an electrostatic breakdown is liable to occur. It has been found that, if the clutch is mechanically overloaded with the electroviscous fluid fully solidified, cracks tend to develop in the solidified fluid and electrostatic breakdown through these cracks takes place. Whilst a stiffer electroviscous fluid gave better torque transmission and whilst a narrower gap also gave better torque transmission for a given potential, difficulty was experienced in attempting to fill a narrower gap with the stiffer paste.

Whilst the invention has been particularly described with reference to an electroviscous fluid actuated device in the form of a clutch, the invention is not so limited. It may advantageously be used with brakes as well as clutches. In the case of a brake, one of the two plates or equivalent will be fixed and it will be generally convenient to insulate the fixed plate or other member with respect to earth and to apply the high voltage to such fixed plate or other member. The rotating plate or complementary member would then be earthed through a leaf spring or other form of electrical contact.

An electroviscous fluid-actuated brake in accordance with the invention may advantageously be used in an anti-skid brake system wherein repeated and rapid on and off operations of the brake are necessitated. Because the brake can be directly actuated electrically, the various relay valves normally associated with anti-skid system are avoided.

It has surprisingly been found that the risk of electrostatic breakdown of the electro-viscous fluid is substantially reduced if a rapidly fluctuating or pulsating d.c. or a pulsed d.c. of a frequency of, for example about 60 Hz is used rather than a continuous uniform or constant d.c. Another advantage of the use of a pulsed d.c. is that the power consumption is reduced, it being possible to keep the electroviscous fluid solid even with a pulsating electrostatic field. A further advantage is that more accurate torque control can be maintained during slippage.

Whilst electroviscous fluid-actuated devices have been described in the form of clutches and brakes, other applications of the invention are envisaged. One such application is to a workpiece holder for a lathe, more specifically a chuck. Another application is to vehicle suspension systems wherein springs and shock absorbers may be replaced by electroviscous fluid-actuated devices which are controlled by a microprocessor to vary damping characteristics. A further application is the control of fluid flow to hydraulic actuators.

It has been found that electroviscous fluid actuated devices consume such a small current, of the order of $10^{-5}$ to $10^{-10}$ amps, that the current cannot be accurately measured by relatively simple techniques. Accordingly, the power consumption of the device is extremely low.

We claim:

1. An electroviscous fluid-actuated device comprising
electrodes defining a gap therebetween,
an electroviscous fluid in said gap, and
means for applying a pulsating electrostatic field to the electroviscous fluid in said gap by connecting a direct current voltage source to said electrodes,
said direct current voltage source being rapidly pulsed to repeatedly provide a plurality of direct current pulses per second.

2. A device according to claim 1 in which the electrical potential of the direct current voltage source is about 5 KV.

3. A device according to claim 1 in which the gap between the electrodes is between 2 mm and 5 mm.

4. A device according to claim 1, in which the electroviscous fluid comprises a suspension of particles in a liquid, the ratio by weight of particles to liquid being at least 1:1.

5. A device according to claim 1 in which the electroviscous fluid comprises a suspension of particles in a silicone fluid with the ratio by weight of particles to liquid being at least 1:1.

6. A device according to claim 5 in which said particles are hygroscopic.

7. A device according to claim 5 in which the viscosity of the silicone fluid is between 1 and 500 centistokes.

8. A device according to claim 7 in which the viscosity of the silicone fluid is about 350 centistokes.

9. A device according to claim 8, in which the ratio by weight of particles to silicone fluid is not substantially more than 1.8:1.

10. A device according to claim 1, in which the electrodes are defined respectively by two relatively rotatable members which are coupled together by said electroviscous fluid when said direct voltage is applied to said electrodes.

11. A device according to claim 1 in which the electrical potential of the direct current voltage source is about 2.5 KV.

* * * * *